United States Patent [19]

Schoemer

[11] 4,124,879
[45] Nov. 7, 1978

[54] ILLUMINATION APPARATUS FOR USE IN AN ILLUMINATABLE PUSHBUTTON KEYSET AND THE LIKE

[75] Inventor: Hans L. Schoemer, Schaumburg, Ill.

[73] Assignee: Motorola, Inc., Schaumburg, Ill.

[21] Appl. No.: 799,055

[22] Filed: May 20, 1977

[51] Int. Cl.² .................................... G01D 11/28
[52] U.S. Cl. ........................... 362/26; 362/24; 362/30; 362/32
[58] Field of Search ............. 362/24, 26, 27, 28, 362/29, 30, 32

[56] References Cited

U.S. PATENT DOCUMENTS

| | | | |
|---|---|---|---|
| 3,137,447 | 6/1964 | Dorman | 362/24 X |
| 3,617,727 | 11/1971 | Balfour-Lynn | 362/32 X |
| 3,619,591 | 11/1971 | Korski | 362/32 |
| 3,712,724 | 1/1973 | Courtney-Pratt | 362/32 X |
| 3,718,814 | 2/1973 | Van Slyke | 362/32 |
| 3,774,021 | 11/1973 | Johnson | 362/27 |
| 3,781,537 | 12/1973 | Ramsey | 362/32 |
| 3,819,928 | 6/1974 | Kuroyama et al. | 362/32 X |
| 3,853,088 | 12/1974 | Marko | 362/27 X |

*Primary Examiner*—Peter A. Nelson
*Attorney, Agent, or Firm*—James W. Gillman; Rolland R. Hackbart

[57] ABSTRACT

An illumination apparatus which includes a plurality of indicating means arranged in rows, a light source, a light pipe assembly having a plurality of transparent light pipes disposed between the rows of indicating means, and means for distributing the light rays from the light source so that the indicating means are evenly and uniformly illuminated.

9 Claims, 3 Drawing Figures

ILLUMINATION APPARATUS FOR USE IN AN ILLUMINATABLE PUSHBUTTON KEYSET AND THE LIKE

BACKGROUND OF THE INVENTION

1. Field of the Invention

This invention relates to an illumination apparatus, and more particularly, to an improved illumination apparatus for use in an illuminatable pushbutton keyset and the like.

2. Description of the Prior Art

In a low ambient-light environment an effective and efficient illumination apparatus is necessary to illuminate a pushbutton keyset or dial in an instrument such as a telephone set. In the prior art, various ways have been used to illuminate the keyset of a telephone set or other instrument. A generally well known approach involves the use of back lighting with a transparent or translucent front cover. This approach requires a light source from the back, necessitating a relatively deep light box to distribute the light rays over the entire keyset or dial. This type of lighting arrangement tends to produce glare, reflections and uneven illumination of the keyset or dial.

These problems have been solved to some degree by utilizing edge lighting for pushbutton keysets. The edge lighting arrangement entails the use of an edge lit front panel placed on top of the pushbutton keyset. An edge lit top panel is used to miniaturize the keyset so that it can be mounted in the handset of a telephone set. Other lighting approaches are not practical due to the large size and mechanical complexity of prior art pushbutton keysets. The lighting of a keyset from an edge lit top panel is non-uniform and can be only slightly improved by using a plurality of light sources at the various edges. Typically, only one light source is used resulting in a bright spot at the edge of the panel adjacent to the light source and relatively inadequate lighting at the opposite edge from the light source. Front lighting also places a flat plastic cover over the graphics on the background, resulting in some distortion and more difficult perception of the graphics. The pushbutton keys, which must pass through the top panel, also block some of the light rays from reaching other areas of the front surface, thereby producing shadows and uneven lighting.

For the foregoing and other shortcomings and problems, there has been a long felt need for an improved illumination apparatus for use in an illuminatable pushbutton keyset and the like.

SUMMARY OF THE INVENTION

Accordingly, it is an object of the present invention to provide an improved illumination apparatus.

It is a further object of the present invention to provide illumination apparatus that provides indirect and uniform lighting.

It is a still further object of the present invention to provide an improved illumination apparatus that evenly flood lights an illuminatable indicating means from the back.

It is yet a further object of the present invention to provide an improved illumination apparatus for an illuminatable indicating means that is compact enough to be included in reasonably small devices, such as the handset of a telephone set.

In accordance with the present invention, the aforementioned problems and shortcomings of the prior art are overcome and the aforementioned and other objects are attained by an improved illumination apparatus.

According to the present invention, an illumination apparatus is provided for lighting an illuminatable indicating means arranged in rows such as a pushbutton keyset which is used in a telephone set. The illumination apparatus includes a plurality of illuminatable indicating means arranged in rows, a light source, a light pipe assembly and light distributing means. The light pipe assembly has a plurality of transparent light pipes disposed between the rows of the indicating means. The light distributing means receive the light rays from the light source and distributes the light rays to the light pipes which evenly illuminate the indicating means. The illumination provided by the apparatus is uniform in that there are no bright spots or glare. The illumination apparatus in accordance with the present invention can be advantageously utilized to illuminate a pushbutton keyset of a telephone set in a low ambient-light environment.

According to other features of the invention, the light source is disposed within the light distributing means, and the light distributing means is connected to one end of each of the light pipes to form a plurality of light pipe fingers. Indirect lighting is provided by selected opaque and reflective areas of the light pipe assembly. The light pipe assembly is located between and behind the indicating means and provides flood lighting from the back to evenly illuminate the indicating means.

Additional features, objects and advantages of the illumination apparatus in accordance with the present invention will be more clearly apprehended from the following detailed description together with the accompanying drawings.

DESCRIPTION OF THE PREFERRED EMBODIMENT

Figure 1:
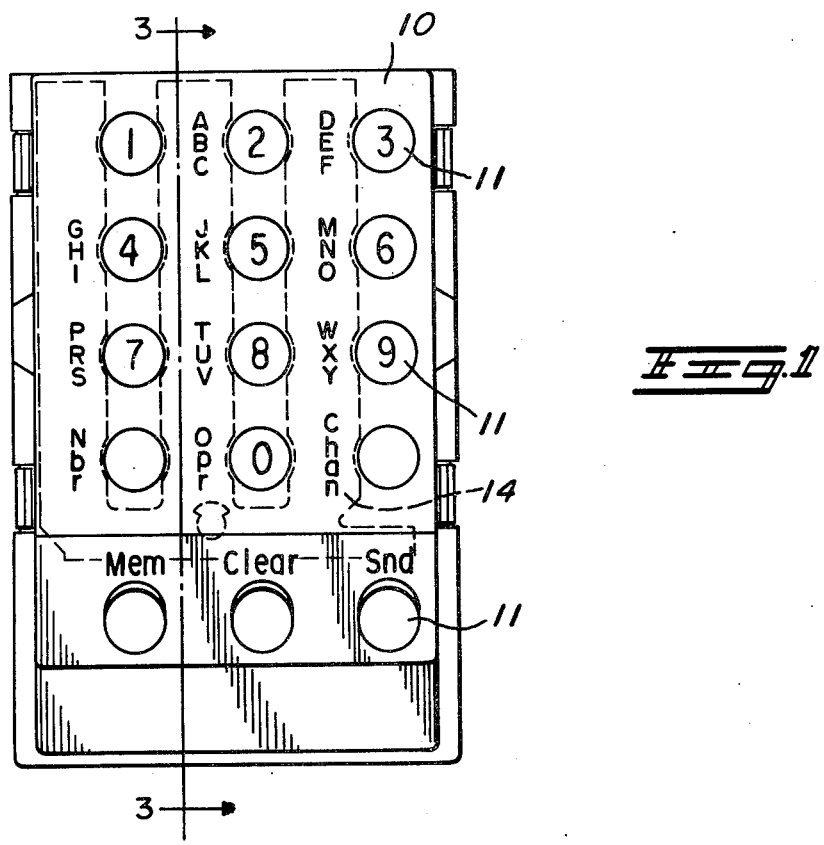
FIG. 1 illustrates an illuminatable pushbutton keyset for a telephone set to which the present invention may be advantageously applied.

Referring now to FIG. 1, an illuminatable pushbutton keyset in accordance with the present invention is shown which can be advantageously utilized in a telephone set. The keyset including the illumination apparatus is relatively small and compact enough to be disposed in the handset of a telephone set. The illumination apparatus provides indirect lighting, thereby eliminating glare or reflection. The pushbutton keys 11 and the housing 10 of the keyset are evenly flood lit from the back, thereby providing uniform illumination for viewing in a low ambient-light environment. Since the keyset is illuminated from the back, the graphics on the housing 10 and the pushbutton keys 11 are clearly visible, thereby insuring reliable operation of the keyset. Thus, the advantages of back lighting are attained without the use of a deep light box behind the keyset.

Figure 2:
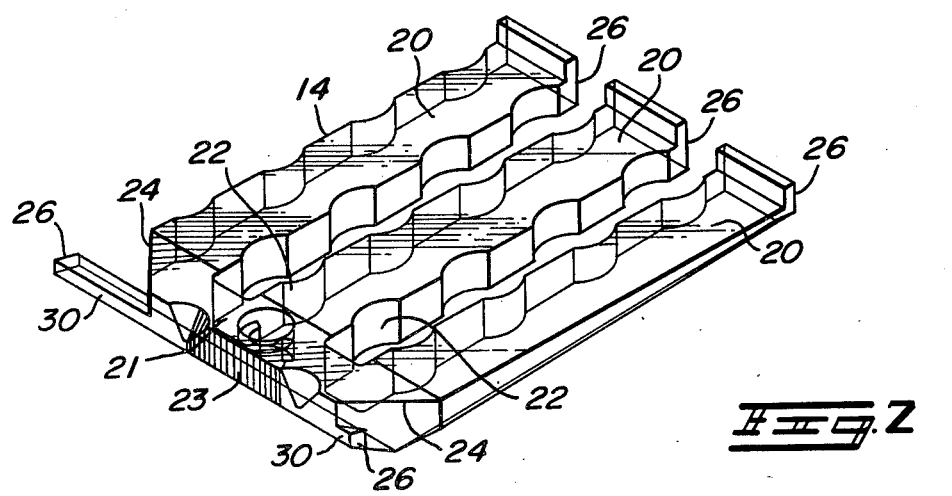
FIG. 2 shows a planar view of a light pipe assembly from the bottom which is utilized in the keyset of FIG. 1.

Referring to FIG. 2, the light pipe assembly 14 which provides the back lighting for the keyset is shown from the bottom. The light pipe assembly 14 has a plurality of transparent light pipes 20 and 30, of which five are included in the preferred embodiment, that conduct the light rays from the light source 15 to evenly flood light the keyset. The light pipes 20 are arranged between the columns of the numerical pushbutton keys 11, and light pipes 30 are disposed between the lower two rows of pushbutton keys 11 (see FIG. 1). Light emanating from the light pipes 20 and 30 illuminates the graphics on the housing 10 and the pushbutton keys 11 (see FIG. 1).

The light source 15 is disposed within the light distributing portion 21 of the light pipe assembly 14 which is connected to the one end of the light pipes 20 and 30 to form a plurality of light pipe fingers. In order to provide indirect lighting, portions of the light pipe assembly 14 are painted with opaque black paint 23 and relfective white paint 22 to block and redirect incident light rays. In the light distributing portion 21, light rays from the light source 15 are directed into the light pipes 20 by the polished facets 24 which are disposed at an angle of 45° with respect to the light source 15. The light pipe assembly 14 is made from a transparent material and preferably from acrylic plastic which is both transparent and durable.

The ends 26 of the light pipes 20 and 30 are coated with reflective white paint to prevent incident light rays from escaping through the ends 26. The light pipes 20 and 30 are substantially rectangular in cross section. The top and bottom surfaces of the light pipe assembly 14 are essentially flat. The light pipes 20 are wedge shaped in the longitudinal direction, the bottom flat surface being slightly angled towards the top flat surface. The cross section of the light pipes 20 decreases proceeding longitudinally away from the light distributing portion 21 of the light pipe assembly 14. The convergence angle of the bottom surface with respect to the top surface is preferably between 2° to 5°. The wedge-shaped light pipes 20 provide flood lighting to the keyset by reflecting the conducted indirect light rays out the top surface toward the keyset. Light rays entering the light pipes 20 are reflected back and forth between the top and bottom surfaces, and, at each reflection, the angle of the incidence of the light rays becomes progressively closer to normal until it is less than 42.2° (for acrylic plastic), at which point the light rays emanate from the top and bottom surfaces. Light rays escaping from the bottom surface of the light pipes 20 are reflected back toward the top of the keyset by a white flat element 12 (see FIG. 3) which is placed under the light pipe assembly 14. The wedge-shaped light pipes 20 provide flood lighting to the keyset which is reasonably uniform over the length of the light pipes 20. Although the light rays are primarily directed toward the top surface of the light pipe assembly 14, a light pipe assembly in accordance with the present invention can be advantageously utilized to illuminate any desired surface or configuration of indicating means for many different applications.

Figure 3:
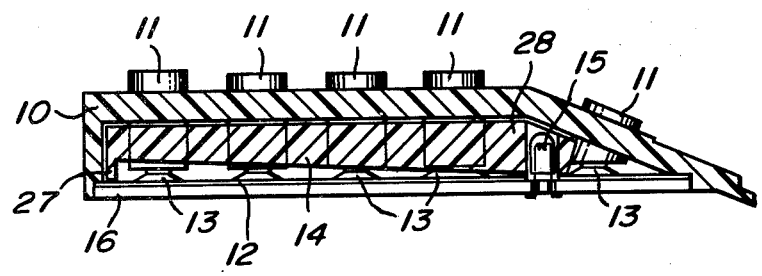
FIG. 3 is a section taken substantially along line 3—3 of FIG. 1.

The foregoing and additional features of the illumination apparatus in accordance with the present invention can be more clearly apprehended by referring to FIG. 3, which is a section taken substantially along the line 3—3 of FIG. 1 looking toward the column of pushbutton keys 2-5-8-0. The wedge-shaped light pipes 20 decrease in thickness proceeding from the end 28 by the light source 15 toward the opposite end 27. A support portion 27 is provided in each of the light pipes 20 to keep the top surface of the light pipe assembly 14 against the housing 10. Immediately beneath the light pipe assembly 14 is a flat element 12 with a plurality of resilient popples 13 which support corresponding pushbutton keys 11. A circuit board 16 is located beneath the flat element 12, firmly supports the flat element 12 and the light pipe assembly 14, contains a plurality of electrical contact pairs for each of the popples 13 and corresponding pushbutton keys 11, and mounts the light source 15 which is a lamp that protrudes from the top of the circuit board 16 and whose leads are solder connected to the bottom of the circuit board 16. The entire keyset assembly is held together by means of clips as described in related United States Application CM-77806, "Modular Pushbutton Keyset Assembly".

When a pushbutton key 11 is depressed, the corresponding resilient popple 13 is deformed such that its conductive underside, provides electrical continuity between the corresponding contact pair on the cirucit board 16. The resilience of the popple 13 returns the pushbutton key 11 to its normal position and breaks the electrical continuity when the pushbutton key 11 is released. The light pipe assembly 14 can be reasonably large while sill providing a compact keyset assembly through the use of the popples 13 on the flat element 12 to provide the electrical switching function for the pushbutton keys 11. The relatively large light pipe assembly 14 maximizes the conduction of light rays for more intensely illuminating the graphics on the housing 10 and the pushbutton keys 11. As described hereinabove, the wedge shape of the light pipes 20 results in a more uniform distribution of the light rays from the light source 15 along the top surface of the light pipe assembly 14. The housing 10 is evenly illuminated along its entire surface, which need not necessarily be flat. An illumination apparatus in accordance with the present invention can be advantageously utilized to evenly illuminate a surface which can be of any shape.

In the preferred embodiment, an illumination apparatus has been shown for a pushbutton keyset for use in a telephone set. However, features of the present invention can be more broadly applied in many other applications. For example, an illumination apparatus in accordance with the present invention can be advantageously utilized to evenly illuminate from a single light source a plaurality of rows and/or columns of a display, including illuminated graphics, switches, pushbutton keys, or dials used for any types of instruments, meters, and the like. Other features which have a broader applicability are the indirect lighting, evenly distributed and intensified flood lighting, and relatively compact back lighting.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. An illumination apparatus comprising:
   a plurality of illuminatable indicating means arranged in rows;
   a light source for providing a plurality of light rays;
   a light pipe assembly having a plurality of transparent light pipe fingers disposed between the rows of said indicating means and having a light distributing portion connected to said light pipe fingers at one end thereof, said light source being disposed within said light distributing portion, said light distributing portion indirectly conducting light rays from said light source to the connected ends of said light pipe fingers, said light pipe fingers providing substantially uniform back illumination of said indicating means with the conducted indirect light rays.

2. The apparatus according to claim 1, wherein said indicating means is a pushbutton keyset having a plurality of pushbutton keys arranged in rows.

3. The apparatus according to claim 1, wherein the ends of said light pipe fingers, opposite from said light distributing portion are coated with a light reflecting material for reflecting incident light rays that would exit from said coated ends of said light pipe fingers.

4. The apparatus according to claim 2, wherein said light pipe fingers are wedge shaped, said wedge-shaped light pipe fingers having flat top and bottom surfaces and decreasing in thickness proceeding away from said light distributing means, the light rays being conducted by said wedge-shaped light pipe fingers and emanating substantially uniformly from the flat surfaces thereof for evenly illuminating said pushbutton keyset.

5. The apparatus according to claim 4, wherein said pushbutton keyset and pushbutton keys are transparent, said transparent pushbutton keyset and pushbutton keys being selectively coated with translucent and opaque material to provide illuminated portions and dark portions on the respective outer surfaces thereof for defining illuminated graphics including alphabetical and numerical characters.

6. The apparatus according to claim 5, including light reflecting means under said wedge-shaped light pipe fingers for reflecting light escaping from the bottom surfaces of said wedge-shaped light pipe fingers back toward said pushbutton keyset to enhance illumination thereof.

7. The apparatus according to claim 6, wherein said pushbutton keyset, said light pipe assembly and said light distributing portion are comprised of acrylic plastic.

8. The apparatus according to claim 1, wherein said light source is centrally disposed within said light distributing portion, and said light distributing portion includes polished facets for indirectly conducting light rays into the connected ends of said light pipe fingers.

9. The apparatus according to claim 8, wherein surfaces of said light pipe assembly are selectively opaque and reflective for redistributing concentrated direct light rays from said light source.

* * * * *